(12) United States Patent
Iwashita et al.

(10) Patent No.: US 6,886,999 B2
(45) Date of Patent: May 3, 2005

(54) CLEANING APPARATUS FOR ELECTRODES OF OPTICAL FIBER FUSION SPLICER

(75) Inventors: Yoshinori Iwashita, Chiba (JP); Akira Okubo, Chiba (JP); Takeshi Sato, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/262,840

(22) Filed: Oct. 3, 2002

(65) Prior Publication Data

US 2003/0128940 A1 Jul. 10, 2003

(30) Foreign Application Priority Data

Nov. 30, 2001 (JP) ........................................ 2001-367501

(51) Int. Cl.[7] ................................................ G02B 6/36
(52) U.S. Cl. .......................................... 385/96; 385/85
(58) Field of Search ...................................... 385/96, 85

(56) References Cited

U.S. PATENT DOCUMENTS

| 5,325,452 A | * | 6/1994 | Stein et al. ................... 385/67 |
| 5,598,495 A | * | 1/1997 | Rittle et al. ................... 385/75 |
| 5,768,738 A | * | 6/1998 | Lee ............................. 15/210.1 |
| 6,047,716 A | * | 4/2000 | Shimoji et al. ........... 134/166 C |
| 6,139,196 A | * | 10/2000 | Feth et al. .................... 385/97 |

* cited by examiner

*Primary Examiner*—Dean A. Reichard
*Assistant Examiner*—Anton Harris
(74) *Attorney, Agent, or Firm*—Oblon, Spivak, McClelland, Maier & Neustadt, P.C.

(57) ABSTRACT

The cleaning apparatus for electrodes includes a supporting container provided with a replaceable brush body; and a rotation mechanism for the rotation of the supporting container. The brush body accepts the insertion of the electrodes and cleans the tip end thereof by rotation.

8 Claims, 3 Drawing Sheets

CLEANING APPARATUS FOR ELECTRODES OF OPTICAL FIBER FUSION SPLICER

BACKGROUND OF THE INVENTION

1. Field of the Invention

The present invention relates to a cleaning apparatus for electrodes applied to an optical fiber fusion splicer.

2. Description of the Related Art

An optical fiber fusion splicer comprises a pair of blocks on which two optical fibers are placed respectively, a pair of electrodes which generates an arc discharge therebetween so as to fuse and splice the optical fibers. A tip end of each electrode is of a tapered shape so as to generate an arc discharge easily and the electrodes are connected to a power source device which generates high voltage. The tapered shape of the tip ends of the electrodes are shaped precisely to achieve a correct splicing of fine optical fibers. The fusion splicer is housed in an appropriate chassis.

Fusion splicing of optical fibers is described as follows. First, two optical fibers are fixed on the respective blocks and the tip ends thereof are contacted mutually. Second, the pair of electrodes are brought closed to the contact point of the optical fibers. Next, a high voltage is applied to the pair of electrodes so as to generate an arc discharge and to fuse the contact point with heat generated by the arc discharge. The optical fibers are further pressed to each other, thereby the fusion splicing between the optical fibers is accomplished and finished.

SUMMARY OF THE INVENTION

According to the proposed fusion splicer described above, arc discharges have a tendency of the shape or position thereof changing after discharging several times. In that case, fusion splicing cannot be accomplished normally because heat is applied to an inadequate position of the optical fibers, and, in severe cases, the product may be rejected. When the electrodes are inspected in such cases, extraneous substances adhered thereon are frequently observed.

If the adhered extraneous substances are chipped away with an edge tool and the like, the electrodes can be recovered, so as to be able to generate an arc discharge normally. However, the tip ends of the electrodes are easily deformed or scratched with the edge tool, therefore the cleaning operation causes a failure of the shape accuracy of the electrode tip end. Thus the electrodes often need to be changed, and it raises production costs. Furthermore, when cleaning or changing the electrodes, the chassis of the fusion splicer must be opened and the electrodes must be detached therefrom. This operation damages the productivity of the fusion splicing.

The present invention is accomplished in view of the above problems and the purpose is a provision of a cleaning apparatus for electrodes with which the tip ends of the electrodes are perfectly cleaned by an easy procedure.

According to the first aspect of the present invention, the cleaning apparatus for electrodes includes a supporting container provided with a replaceable brush body; and a rotation mechanism for a rotation of the supporting container. The brush body accepts insertion of the electrodes and cleans the tip end thereof by rotation.

The tip end of the electrode is rubbed with the brush body so that any extraneous substances are removed therefrom. The tip end of the electrode is prevented from asymmetric deformation because the tip end is rubbed axis-symmetrically and is prevented from scratching because there is no use of an edge tool. Furthermore the cleaning operation is easily achieved simply by pressing the electrode into the brush body. The electrode is recovered so as to be reused with the easy operation, thereby the electrode may be reused until it has been worn off.

According to the second aspect of the present invention, the cleaning apparatus includes a chuck to which an electrode is detachably attached; and a rotation mechanism for a rotation of the chuck. The tip end of the electrode attached to the chuck accepts abutting of a brush body filled in a supporting container and is cleaned by the brush body with the rotation thereof.

According to the constitution, in addition to the effect according to the first aspect, the electrode is positioned coaxially with the rotation axis when fixed to the chuck thereby an eccentric rotation thereof is prevented. Therefore the cleaning operation is further made easier.

DETAILED DESCRIPTION OF THE PREFERRED EMBODIMENT

Figure 1:
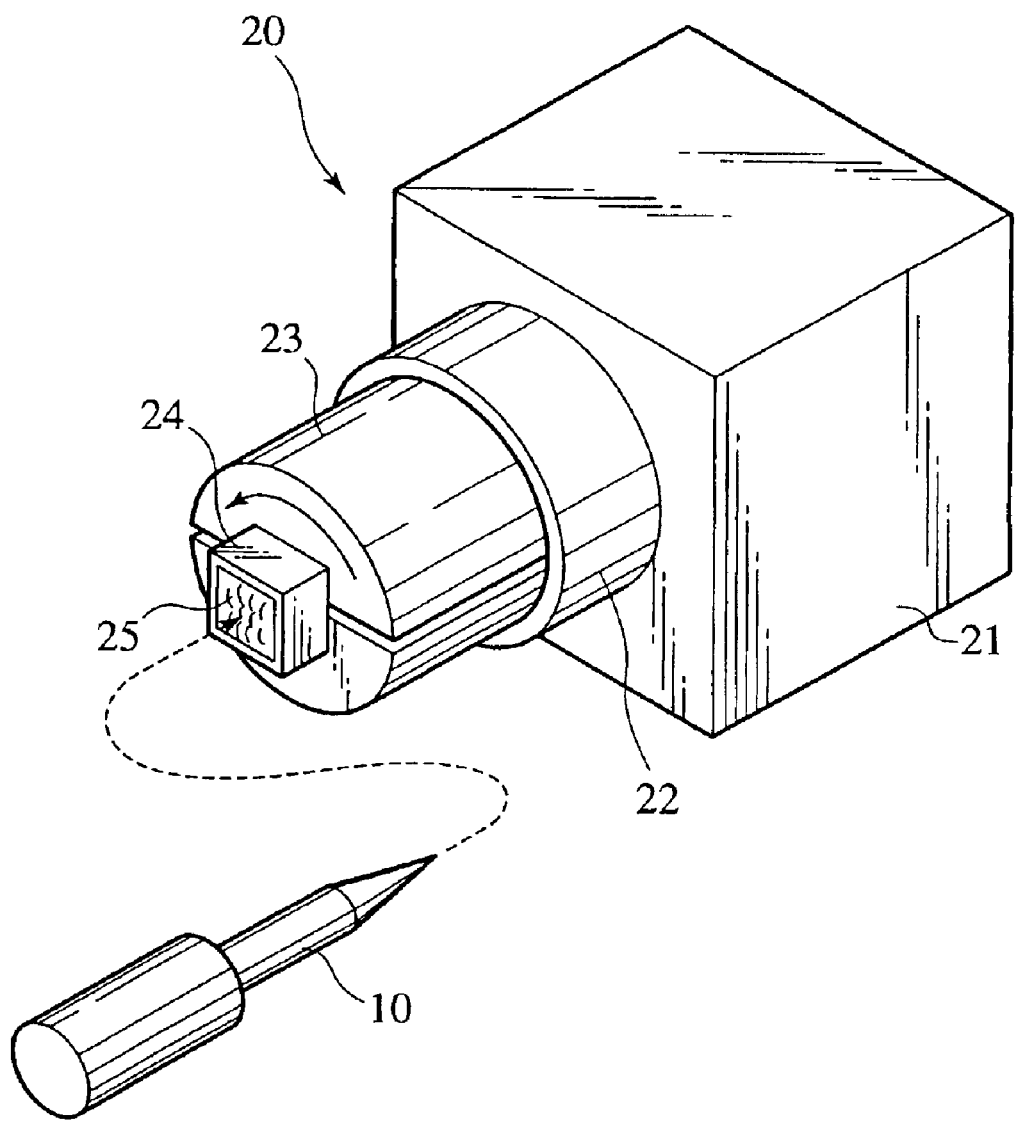
FIG. 1 is a perspective view of a cleaning apparatus for the electrodes of an optical fiber fusion splicer according to the first embodiment of the present invention.

A first embodiment of the present invention is described hereinafter with reference to FIG. 1.

The cleaning apparatus 20 according to the present invention comprises a chassis 21 housing a motor (not shown); a chuck 23 engaged with a rotation axis 22 of the motor; and a supporting container 24 fixed to the chuck 23. The chuck 23 may be inserted into and engaged with the rotation axis 22, and may be extracted and detached therefrom. A brush body 25 is replaceably filled in the supporting container 24. As the brush body 25, a steel wool and a nylon brush are preferably exemplified. The supporting container 24 of the brush body 25 is shaped to be, for example, an angular tube so as not to rotate the brush body 25 in relation to the supporting container 24. The supporting container 24 is fixed to the chuck 23 and the chuck 23 is further inserted into the rotation axis 22 so as to be engaged.

Figure 3:
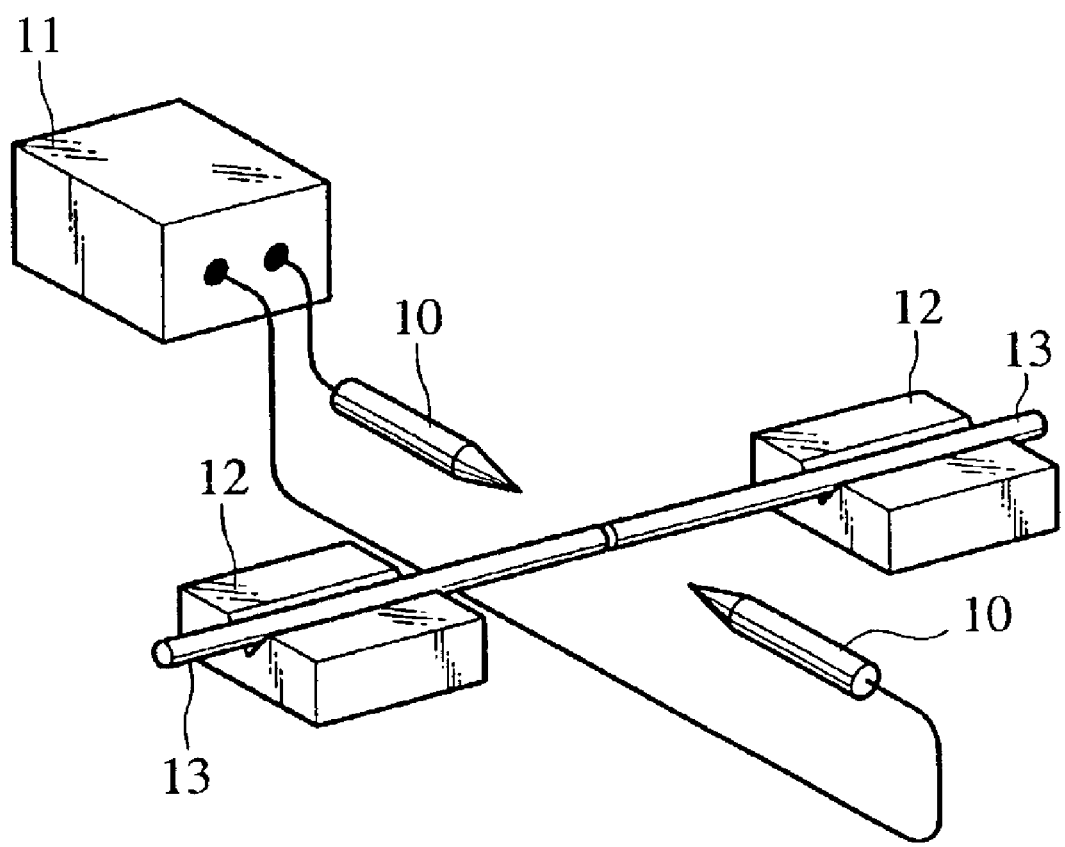
FIG. 3 is a schematic view of a whole constitution of an optical fiber fusion splicer.

In a case where an electrode 10 needs to be cleaned, a tip end thereof may be inserted into the brush body 25 filled in the supporting container 24 as the electrode 10 is kept installed in an optical fiber fusion splicer shown in FIG. 3. Or else, the electrode 10 maybe detached from the fusion splicer, the proximal end thereof fixed appropriately and the tip end thereof inserted into the brush body 25. The tip end of the electrode 10 is closely covered with the brush body 25 and the rotation axis 22 is driven by the motor housed in the chassis 21. The brush body 25 rotates in connection with the supporting container 24 fixed to the chuck 23 and continuously rubs the tip end of the electrode 10.

The tip end of the electrode 10 is rubbed by the brush body 25 so that the extraneous substances adhered thereon are removed without difficulty. The tip end of the electrode 10 is prevented from asymmetric deformation because the tip end is rubbed axis-symmetrically and is prevented from scratching because there is no use of an edge tool. Furthermore the cleaning operation is easily achieved simply by pressing the electrode 10 into the brush body 25. The electrode 10 is recovered without difficulty so as to be reused until it has been worn off. Therefore the cleaning apparatus contributes to a suppression of production costs.

Figure 2:
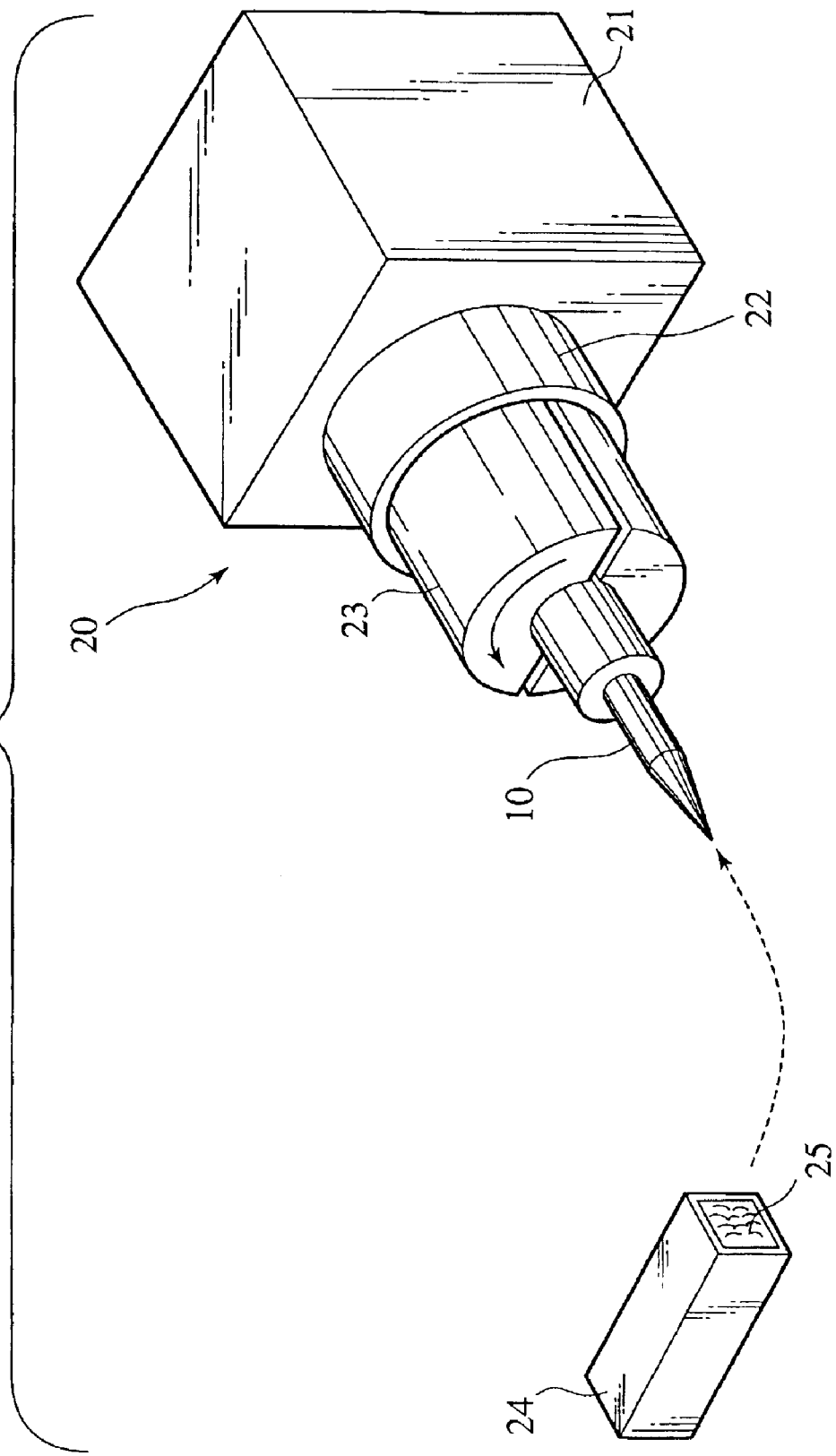
FIG. 2 is a perspective view of a cleaning apparatus for the electrodes of an optical fiber fusion splicer according to the second embodiment of the present invention.

A second embodiment of the present invention is described hereinafter with reference to FIG. 2.

According to the second embodiment, in contrast with the first embodiment, the brush body 25 is fixed and the electrode 10 rotates. The electrode 10 is fixed to the chuck 23 at the proximal end thereof and rotates in connection with the rotation axis 22. The supporting container 24 filled with the brush body 25 may be supported appropriately with hands and the like.

The electrode 10, when cleaning, is detached from the optical fiber fusion splicer and the proximal end thereof is fixed to the chuck 23. And the chuck 23 is inserted to the rotation axis so as to be engaged therewith. Next, the supporting container 24 is supported with hands and the like and the brush body 25 is pressed to the end tip of the electrode 10 so that the tip end of the electrode 10 is closely covered therewith. In that condition, the motor housed in the chassis 21 drives the rotation axis 22 to rotate so that the brush body 25 continuously rubs the tip end of the electrode 10, as is the case with the first embodiment.

The tip end of the electrode 10 is rubbed by the brush body 25 so that the extraneous substances adhered thereon are removed without difficulty. The tip end of the electrode 10 is prevented from asymmetric deformation because the tip end is rubbed axis-symmetrically and is prevented from scratch because of none use of an edge tool. The electrode 10 is positioned coaxially with the chuck when fixed so that the rotation is prevented from decentering. Furthermore the cleaning operation is easily achieved simply by pressing the electrode 10 into the brush body 25. The electrode 10 is recovered without difficulty so as to be reused until it has been worn off. Therefore the cleaning apparatus contributes to a suppression of production costs.

The contents of Japanese Patent Application No. 2001-367501 (filed on Nov. 30, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A cleaning apparatus for an electrode of an optical fiber splicer, comprising:
   a supporting container comprising a replaceable brush body;
   a rotation mechanism configured to rotate the supporting container and the brush body about a rotation axis along which the rotation mechanism extends; and
   a motor configured to rotate the rotation mechanism about the rotation axis;
   wherein the brush body is configured to accept an insertion of the electrode and to clean a tip end of the electrode by rotation.

2. A cleaning apparatus for an electrode of an optical fiber splicer, comprising:
   a chuck configured to removably retain an electrode; and
   a rotation mechanism configured to rotate the chuck and the electrode about a rotation axis along which the rotation mechanism extends; and
   a motor configured to rotate the rotation mechanism about the rotation axis;
   wherein the chuck is configured such that a tip end of the electrode attached to the chuck contacts a brush body replaceably supported in a supporting container and is cleaned by the brush body with the rotation thereof.

3. A cleaning apparatus, comprising:
   a container;
   a cleaning member disposed in the container and configured to clean an end of an electrode; and
   a drive member extending along an axis and configured to rotate the container and the cleaning member about the axis without oscillating the container and the cleaning member.

4. The cleaning apparatus according to claim 3, wherein the cleaning member comprises a brush body.

5. The cleaning apparatus according to claim 4, wherein the brush body comprises one of a steel wool and a nylon material.

6. A cleaning apparatus, comprising:
   a chuck configured to retain an electrode to be placed in contact with a cleaning member; and
   a drive member extending along an axis and configured to rotate the chuck and the electrode about the axis relative to the cleaning member without oscillating the chuck and the electrode.

7. The cleaning apparatus according to claim 6, further comprising:
   a brush body configured to be placed in contact with and to clean an end of the electrode.

8. The cleaning apparatus according to claim 7, wherein the brush body comprises one of a steel wool and a nylon material.

* * * * *